Oct. 6, 1953         R. M. M. OBERMAN ET AL         2,654,837
WHEATSTONE BRIDGE TESTING ARRANGEMENT
Filed May 5, 1948

INVENTORS:
ROELOF MAARTEN MARIE OBERMAN
AND ANTONIE SNIJDERS
BY

Patented Oct. 6, 1953

2,654,837

UNITED STATES PATENT OFFICE 2,654,837

WHEATSTONE BRIDGE TESTING ARRANGEMENT

Roelof M. M. Oberman and Antonie Snijders, The Hague, Netherlands

Application May 5, 1948, Serial No. 25,108
In the Netherlands May 8, 1947

8 Claims. (Cl. 250—27)

The invention relates to an arrangement for testing Wheatstone direct current bridges as e. g. required in transmission systems, in which selectors are positioned through the application of this principle.

In a known arrangement of this kind four tubes are provided and it is therefore an expensive element in the controlling register of the mentioned kind of transmission systems.

Though the arrangement according to the invention contains only two tubes, it has the same effect as the known one, cost and space being economized. In one embodiment of the present invention an input tube has two electrodes, the voltages of which change in opposite sense under the control of the control grid are each connected on one side via a resistor to one terminal of a voltage source $(V_1+V_2)$ and on the other side via a voltage divider to the other terminals of the voltage source $(V_1+V_2)$, while the tapping points of the two voltage dividers are connected via two rectifiers (which are arranged in the same sense) to a control electrode (e. g. the control grid) of an output tube, another controlling electrode (e. g. the cathode) of which is connected to a tapping of the voltage source so that, when the input voltage changes from one value to another, the conductivity of the output tube is first reversed under the control of one of the voltage dividers, while under the control of the other voltage divider the output tube resumes its original condition after the conductivity of the mentioned rectifiers has been reversed.

The invention will be explained more in detail with reference to the drawings in which.

Figure 1:
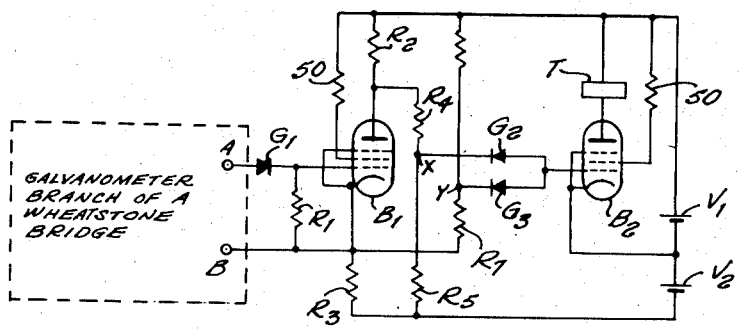
Fig. 1 is a wiring diagram of an embodiment of the present invention.

The arrangement according to Fig. 1 shows a zero indicator, termed zero switch hereafter, having two conventional high vacuum tubes, such as pentodes $B_1$ and $B_2$. The input terminals A and B, which are inserted in the galvanometer branch of a Wheatstone bridge (not shown), are connected to the input tube $B_1$ (termed hereinafter the first tube) via rectifying means $G_1$ and resistive means $R_1$, optionally with the insertion of a source (not shown) of low voltage for the positioning of the grid voltage-anode current characteristic of the tube $B_1$.

The rectifier $G_1$ and the resistor $R_1$ protect the input tube $B_1$ against input voltages which make terminal A positive with respect to terminal B, because the rectifier $G_1$ is conductive for input voltages which make terminal A negative with respect to terminal B, so that the control grid voltage of the input tube $B_1$ can follow the applied voltage, whereas the rectifier $G_1$ is non-conductive for input voltages of opposite polarity. The anode of tube $B_1$ is connected to a resistor $R_2$ and the cathode to a resistor $R_3$. The junction of the anode of the input tube and the resistor $R_5$ is connected via a voltage divider consisting of the resistors $R_4$ and $R_5$ to the negative terminal of the total voltage source $(V_1+V_2)$ whereas the function of the cathode of the input tube $B_1$ and the resistor $R_3M$ connected to the positive terminal of the voltage source $(V_1, V_2)$ via a voltage divider consisting of the resistors $R_6$ and $R_7$.

The tapping points X and Y of the two voltage dividers are connected to the control grid of the output tube $B_2$ (termed hereinafter the second tube), via the rectifiers $G_2$ and $G_3$, respectively.

When the input tube $B_1$ is non-conductive owing to a sufficiently high negative input voltage, the potentials of the points X and Y are determined by the ratio of the component resistors of the voltage dividers which have large resistance values in comparison to the resistors $R_2$ and $R_3$.

When the potential of the point X is positive and the potential of the point Y negative with respect to the cathode of the output tube $B_2$ and the input tube $B_1$ becomes conductive, the potential of the point X becomes negative and the potential of the point Y becomes positive with respect to that of the cathode of the output tube $B_2$, the anode of the input tube $B_1$ becoming less positive and the cathode of this tube becoming less negative. The tapping points of the two voltage dividers represent this change in the ratio of their component resistors.

The two rectifiers $G_2$ and $G_3$ form a connection between the points X and Y. Dependent on the polarity of the voltage difference between these two points one rectifier will be conductive and the other one non-conductive.

When the input tube $B_1$ under the influence of a sufficiently high negative input voltage is non-conductive, the output tube $B_2$ is also non-conductive under the influence of the potential of the point Y which is transferred to the grid of tube $B_2$ via the conductive rectifier $G_3$.

Figures 1A, 1B:
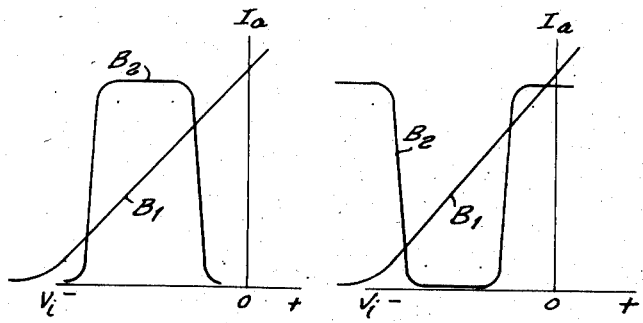
Figs. 1a and 1b are diagrams for explaining the operation of the arrangement according to Fig. 1

By a decrease of the negative input voltage the input tube $B_1$ will become gradually conductive, so that the voltage applied to the voltage divider $R_6/R_7$ is decreased and the potential of the point Y becomes less negative so that the output tube $B_2$ becomes quickly conductive. Thus the output tube follows the change in potential of the point Y. When the potential difference of the points X and Y changes the size thereof in consequence of the input voltage changing less negative values, the rectifier $G_2$ becomes conductive, the rectifier $G_3$ becoming non-conductive so that the output tube follows the potential change of the point X. At a further change of the input voltage to even lesser negative values the point X assumes a negative potential with respect to the cathode of the output tube $B_2$, so that the latter is brought again into non-conductive condition under the control of the potential of the point X, via the conductive rectifier $G_2$. The anode current characteristics of the two tubes $B_1$ and $B_2$ are shown diagrammatically in Fig. 1a. Fig. 1a illustrates the anode current characteristic curves of tubes $B_1$ and $B_2$ vs. input voltage. It will be noted from Fig. 1a that the change in anode current in tube $B_1$ is substantially linear while the plate current variation of tube $B_2$ assumes a substantially rectangular form. The slope of the leading and the lagging edges of the current curve of tube $B_2$ may be controlled by proper choice of the resistors $R_4$, $R_5$, and $R_6$, $R_7$ of the two voltage dividers. It is therefore possible to adjust the rise time and the decay time of the current curve of tube $B_2$ to any suitable value, preferably approaching as closely as possible, zero rise and decay time.

It is also possible to reverse the two rectifiers $G_2$ and $G_3$ in the circuit so that when tube $B_1$ has no anode current flowing therethrough (as a result of a large negative input potential) tube $B_2$ will conduct maximum plate current as indicated in Fig. 1b. When the rectifiers $G_2$ and $G_3$ are connected in reverse direction to the direction illustrated in the circuit of Fig. 1, a different cathode potential must be supplied to the cathode of tube $B_2$ than the cathode potential used in the arrangement illustrated in Fig. 1. As the input potential becomes less negative, anode current will begin to flow in tube $B_1$ as indicated in Fig. 1b, whereas plate current flow through tube $B_2$ will decrease rapidly until plate current flow through tube $B_2$ is completely cut off. This occurs when the polarity of the potential difference between X and Y is reversed, thereby making the rectifier $G_3$ conductive and the rectifier $G_2$ non-conductive. As the input voltage becomes even less negative, output tube $B_2$ will follow the potential of the point Y which will change from a negative to a positive value with respect to the potential of the cathode of tube $B_2$. At that point the output tube $B_2$ again becomes conductive as indicated in Fig. 1b.

The advantage of the characteristic according to Fig. 1b is the following. When the zero indicator is used in transmission systems in which selectors are positioned by means of the equilibrium of Wheatstone direct current bridges, use is made of the release time of a testing device or relay T connected in the anode circuit of the output tube. As a rule a device is obtained that functions much more quickly with a smaller capacity of the output tube than a device in which the test relay attracts the armature when the selector to be positioned finds bridge equilibrium.

Figure 2:
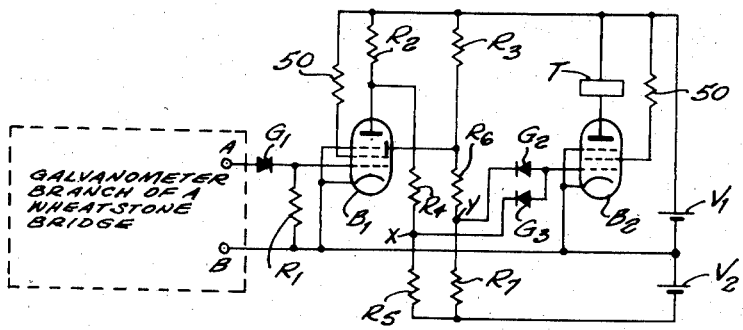
Fig. 2 shows a modification of the arrangement according to Fig. 1.

Fig. 2 shows a modified embodiment of the arrangement according to Fig. 1. A drawback of the arrangement according to Fig. 1 is that the anode voltage sources $V_1$ and $V_2$ cannot serve for more than one joint zero switch, which drawback has been overcome by the embodiment shown in Fig. 2 by the use of an input tube $B_1$ with a secondary emission electrode. Otherwise, the arrangement, which, as regards the application of a secondary emission electrode is only shown in principle in Fig. 2, is equal to the arrangement according to Fig. 1.

The characteristics that are to be obtained, correspond to those shown in Figs. 1a and 1b.

Without further explanation it will be clear that one-sided characteristics of the zero switch can be obtained by disconnecting one of the points X or Y from the rectifiers $G_2$ or $G_3$, i. e. characteristics in which the output tube at a certain input voltage changes its conductive condition. These characteristics are e. g. required in transmission systems when a voltage that is greater or smaller than a certain value, has to be found.

While we have illustrated and described what we regard to be the preferred embodiment of our invention, nevertheless it will be understood that such is merely exemplary and that numerous modifications and rearrangements may be made therein without departing from the essence of the invention.

We claim:

1. A testing arrangement for insertion into the galvanometer branch of a Wheatstone D. C. bridge arrangement, comprising, in combination, a first vacuum tube having a cathode, a control grid, and an anode; an input circuit including said cathode and said control grid of said first tube and being inserted into the galvanometer branch of the Wheatstone D. C. bridge arrangement so as to be imparted a direct voltage depending as to sign and magnitude on the condition of the Wheatstone D. C. bridge arrangement; a voltage source having a tapping and a positive and a negative terminal, said negative terminal being connected to said cathode of said first tube, said positive terminal being connected to said anode of said first tube; a first voltage divider having a tapping and being inserted between said anode of said first tube and said negative terminal of said voltage source; a second voltage divider having a tapping and being inserted between said cathode of said first tube and said positive terminal of said voltage source, whereby said tappings of said voltage dividers are imparted a potential difference depending on the sign and magnitude of the direct voltage imparted to said input circuit; a second vacuum tube having a cathode, a control grid and an anode, said cathode of said second tube being connected to said tapping of said voltage source; a first rectifier and a second rectifier inserted, respectively, between said control grid of said second tube and said tappings of said voltage dividers so that one of said rectifiers is conductive and the other non-conductive depending on the sign of the potential difference imparted to said tappings of said voltage dividers; and a testing device inserted between the anode of said second tube and said positive terminal of said voltage source, whereby the anode current of said second tube flowing through said testing device is responsive to the potential difference imparted to said tappings of said voltage dividers, which in turn depends on the sign and magnitude of the direct voltage imparted to said input circuit.

2. A testing arrangement for insertion into the galvanometer branch of a Wheatstone D. C. bridge arrangement, comprising, in combination, a first vacuum tube having a cathode, a control grid, and an anode; an input circuit including said cathode and said control grid of said first tube and being inserted into the galvanometer branch of the Wheatstone D. C. bridge arrangement so as to be imparted a direct voltage depending as to sign and magnitude on the condition of the Wheatstone D. C. bridge arrangement; a voltage source having a tapping and a positive and a negative terminal, said negative terminal being connected to said cathode of said first tube, said positive terminal being connected to said anode of said first tube; a first voltage divider having a tapping and being inserted between said anode of said first tube and said negative terminal of said voltage source; a second voltage divider having a tapping and being inserted between said cathode of said first tube and said positive terminal of said voltage source, whereby said tappings of said voltage dividers are imparted a potential difference depending on the sign and magnitude of the direct voltage imparted to said input circuit; a second vacuum tube having a cathode, a control grid and an anode, said cathode of said second tube being connected to said tapping of said voltage source, said voltage dividers being so dimensioned that one of said tappings of said voltage dividers is positive and the other of said tappings of said voltage dividers is negative with respect to said cathode of said second tube; a first rectifier and a second rectifier inserted, respectively, between said control grid of said second tube and said tappings of said voltage dividers so that one of said rectifiers is conductive and the other non-conductive depending on the sign of the potential difference imparted to said tappings of said voltage dividers; and a testing device inserted between the anode of said second tube and said positive terminal of said voltage source, whereby the anode current of said second tube flowing through said testing device is responsive to the potential difference imparted to said tappings of said voltage dividers, which in turn depends on the sign and magnitude of the direct voltage imparted to said input circuit.

3. A testing arrangement for insertion into the galvanometer branch of a Wheatstone D. C. bridge arrangement, comprising, in combination, a first vacuum tube having a cathode, a control grid, and an anode; an input circuit including said cathode and said control grid of said first tube and being inserted into the galvanometer branch of the Wheatstone D. C. bridge arrangement so as to be imparted a direct voltage depending as to sign and magnitude on the condition of the Wheatstone D. C. bridge arrangement; rectifying means inserted between said control grid of said first tube and one of the terminals of the galvanometer branch of the Wheatstone D. C. bridge arrangement, said rectifying means allowing current to pass only when said one terminal of the galvanometer branch has a lower potential than the other terminal of the galvanometer branch; a voltage source having a tapping and a positive and a negative terminal, said negative terminal being connected to said cathode of said first tube, said positive terminal being connected to said anode of said first tube; a first voltage divider having a tapping and being inserted between said anode of said first tube and said negative terminal of said voltage source; a second voltage divider having a tapping and being inserted between said cathode of said first tube and said positive terminal of said voltage source, whereby said tappings of said voltage dividers are imparted a potential difference depending on the sign and magnitude of the direct voltage imparted to said input circuit; a second vacuum tube having a cathode, a control grid and an anode, said cathode of said second tube being connected to said tapping of said voltage source; a first rectifier and a second rectifier inserted, respectively between said control grid of said second tube and said tappings of said voltage dividers so that said rectifiers are conductive and the other non-conductive depending on the sign of the potential difference imparted to said tappings of said voltage dividers; and a testing device inserted between the anode of said second tube and said positive terminal of said voltage source, whereby the anode current of said second tube flowing through said testing device is responsive to the potential difference imparted to said tappings of said voltage dividers, which in turn depends on the sign and magnitude of the direct voltage imparted to said input circuit.

4. A testing arrangement for insertion into the galvanometer branch of a Wheatstone D. C. bridge arrangement, comprising, in combination, a first vacuum tube having a cathode, a control grid, and an anode; an input circuit including said cathode and said control grid of said first tube and being inserted into the galvanometer branch of the Wheatstone D. C. bridge arrangement so as to be imparted a direct voltage depending as to sign and magnitude on the condition of the Wheatstone D. C. bridge arrangement; rectifying means inserted between said control grid of said first tube and one of the terminals of the galvanometer branch of the Wheatstone D. C. bridge arrangement, said rectifying means allowing current to pass only when said one terminal of the galvanometer branch has a lower potential than the other terminal of the galvanometer branch; resistive means inserted between said cathode of said first tube and the junction of said rectifying means and said grid of said first tube; a voltage source having a tapping and a positive and a negative terminal, said negative terminal being connected to said cathode of said first tube, said positive terminal being connected to said anode of said first tube; a first voltage divider having a tapping and being inserted between said anode of said first tube and said negative terminal of said voltage source; a second voltage divider having a tapping and being inserted between said cathode of said first tube and said positive terminal of said voltage source, whereby said tappings of said voltage dividers are imparted a potential difference depending on the sign and magnitude of the direct voltage imparted to said input circuit; a second vacuum tube having a cathode, a control grid and an anode, said cathode of said second tube being connected to said tapping of said voltage source; a first rectifier and a second rectifier inserted, respectively, between said control grid of said second tube and said tappings of said voltage dividers so that said rectifiers are conductive and the other non-conductive depending on the sign of the potential difference imparted to said tappings of said voltage dividers; and a testing device inserted between the anode of said second tube and said positive terminal of said voltage source, whereby the anode current of said second tube flowing through said testing device is responsive to the potential difference imparted to said tappings of said voltage dividers, which in turn depends on the sign and magnitude of the direct voltage imparted to said input circuit.

5. A testing arrangement for insertion into the galvanometer branch of a Wheatstone D. C. bridge arrangement, comprising, in combination, a first vacuum tube having a cathode, a control grid, and an anode; an input circuit including said cathode and said control grid of said first tube and being inserted into the galvanometer branch of the Wheatstone D. C. bridge arrangement so as to be imparted a direct voltage depending as to sign magnitude on the condition of the Wheatstone D. C. bridge arrangement; rectifying means inserted between said control grid of said first tube and one of the terminals of the galvanometer branch of the Wheatstone D. C. bridge arrangement, said rectifying means allowing current to pass only when said one terminal of the galvanometer branch has a lower potential than the other terminal of the galvanometer branch; a voltage source having a tapping and a positive and a negative terminal, said negative terminal being connected to said cathode of said first tube, said positive terminal being connected to said anode of said first tube; a first voltage divider having a tapping and being inserted between said anode of said first tube and said negative terminal of said voltage source; a second voltage divider having a tapping and being inserted between said cathode of said first tube and said positive terminal of said voltage source, whereby said tappings of said voltage dividers are imparted a potential difference depending on the sign and magnitude of the direct voltage imparted to said input circuit; a second vacuum tube having a cathode, a control grid and an anode, said cathode of said second tube being connected to said tapping of said voltage source; a first rectifier and a second rectifier inserted, respectively, between said control grid of said second tube and said tappings of said voltage dividers so that one of said rectifiers is conductive and the other non-conductive depending on the sign of the potential difference imparted to said tappings of said voltage dividers; and a testing device inserted between the anode of said second tube and said positive terminal of said voltage source, whereby the anode current of said second tube flowing through said testing device is responsive to the potential difference imparted to said tappings of said voltage dividers, which in turn depends on the sign and magnitude of the direct voltage imparted to said input circuit.

6. A testing arrangement for insertion into the galvanometer branch of a Wheatstone D. C. bridge arrangement, comprising, in combination, a first vacuum tube having a cathode, a control grid, and an anode; an input circuit including said cathode and said control grid of said first tube and being inserted into the galvanometer branch of the Wheatstone D. C. bridge arrangement so as to be imparted a direct voltage depending as to sign and magnitude on the condition of the Wheatstone D. C. bridge arrangement; rectifying means inserted between said control grid of said first tube and one of the terminals of the galvanometer branch of the Wheatstone D. C. bridge arrangement, said rectifying means allowing current to pass only when said one terminal of the galvanometer branch has a lower potential than the other terminal of the galvanometer branch; resistive means inserted between said cathode of said first tube and the junction of said rectifying means and said grid of said first tube; a voltage source having a tapping and a positive and a negative terminal, said negative terminal being connected to said cathode of said first tube, said positive terminal being connected to said anode of said first tube; a first voltage divider having a tapping and being inserted between said anode of said first tube and said negative terminal of said voltage source; a second voltage divider having a tapping and being inserted between said cathode of said first tube and said positive terminal of said voltage source, whereby said tappings of said voltage dividers are imparted a potential difference depending on the sign and magnitude of the direct voltage imparted to said input circuit; a second vacuum tube having a cathode, a control grid and an anode, said cathode of said second tube being connected to said tapping of said voltage source; a first rectifier and a second rectifier inserted, respectively, between said control grid of said second tube and said tappings of said voltage dividers so that one of said rectifiers is conductive and the other non-conductive depending on the sign of the potential difference imparted to said tappings of said voltage dividers; and a testing device inserted between the anode of said second tube and said positive terminal of said voltage source, whereby the anode current of said second tube flowing through said testing device is responsive to the potential difference imparted to said tappings of said voltage dividers, which in turn depends on the sign and magnitude of the direct voltage imparted to said input circuit.

7. A testing arrangement for insertion into the galvanometer branch of a Wheatstone D. C. bridge arrangement, comprising, in combination, a first vacuum tube having a cathode, a control grid, and an anode; an input circuit including said cathode and said control grid of said first tube and being inserted into the galvanometer branch of the Wheatstone D. C. bridge arrangement so as to be imparted a direct voltage depending as to sign and magnitude on the condition of the Wheatstone D. C. bridge arrangement; rectifying means inserted between said control grid of said first tube and one of the terminals of the galvanometer branch of the Wheatstone D. C. bridge arrangement, said rectifying means allowing current to pass only when said one terminal of the galvanometer branch has a lower potential than the other terminal of the galvanometer branch; a voltage source having a tapping and a positive and a negative terminal, said negative terminal being connected to said cathode of said first tube, said positive terminal being connected to said anode of said first tube; a first voltage divider having a tapping and being inserted between said anode of said first tube and said negative terminal of said voltage source; a second voltage divider having a tapping and being inserted between said cathode of said first tube and said positive terminal of said voltage source, whereby said tappings of said voltage dividers are imparted a potential difference depending on the sign and magnitude of the direct voltage imparted to said input circuit; a second vacuum tube having a cathode, a control grid and an anode, said cathode of said second tube being connected to said tapping of said voltage source, said voltage dividers being so dimensioned that one of said tappings of said voltage dividers is positive and the other of said tappings of said voltage dividers is negative with respect to said cathode of said second tube; a first rectifier and a second rectifier inserted, respectively, between said control grid of said second tube and said tappings of said voltage dividers so that one of said rectifiers is conductive and the other non-conductive depending on the sign of the potential difference imparted to said tappings of said voltage dividers; and a testing device inserted between the anode of said second tube and said positive terminal of said voltage source, whereby the anode current of said second tube flowing through said testing device is responsive to the potential difference imparted to said tappings of said voltage dividers, which in turn depends on the sign and magnitude of the direct voltage imparted to said input circuit.

8. A testing arrangement for insertion into the galvanometer branch of a Wheatstone D. C. bridge arrangement, comprising, in combination, a first vacuum tube having a cathode, a control grid, and an anode; an input circuit including said cathode and said control grid of said first tube and being inserted into the galvanometer branch of the Wheatstone D. C. bridge arrangement so as to be imparted a direct voltage depending as to sign and magnitude on the condition of the Wheatstone D. C. bridge arrangement; rectifying means inserted between said control grid of said first tube and one of the terminals of the galvanometer branch of the Wheatstone D. C. bridge arrangement, said rectifying means allowing current to pass only when said one terminal of the galvanometer branch has a lower potential than the other terminal of the galvanometer branch; resistive means inserted between said cathode of said first tube and the junction of said rectifying means and said grid of said first tube; a voltage source having a tapping and a positive and a negative terminal, said negative terminal being connected to said cathode of said first tube, said positive terminal being connected to said anode of said first tube; a first voltage divider having a tapping and being inserted between said anode of said first tube and said negative terminal of said voltage source; a second voltage divider having a tapping and being inserted between said cathode of said first tube and said positive terminal of said voltage source, whereby said tappings of said voltage dividers are imparted a potential difference depending on the sign and magnitude of the direct voltage imparted to said input circuit; a second vacuum tube having a cathode, a control grid and an anode, said cathode of said second tube being connected to said tapping of said voltage source, said voltage dividers being so dimensioned that one of said tappings of said voltage dividers is positive and the other of said tappings of said voltage dividers is negative with respect to said cathode of said second tube; a first rectifier and a second rectifier inserted, respectively, between said control grid of said second tube and said tappings of said voltage dividers so that one of said rectifiers is conductive and the other non-conductive depending on the sign of the potential difference imparted to said tappings of said voltage dividers; and a testing device inserted between the anode of said second tube and said positive terminal of said voltage source, whereby the anode current of said second tube flowing through said testing device is responsive to the potential difference imparted to said tappings of said voltage dividers, which in turn depends on the sign and magnitude of the direct voltage imparted to said input circuit.

ROELOF M. M. OBERMAN.
ANTONIE SNIJDERS.

References Cited in the file of this patent

UNITED STATES PATENTS

| Number | Name | Date |
|---|---|---|
| 1,694,237 | Simonds | Dec. 4, 1928 |
| 2,189,582 | Hinegine | Feb. 6, 1940 |
| 2,275,368 | Krause | Mar. 3, 1942 |
| 2,305,307 | Wellenstein et al. | Dec. 15, 1942 |
| 2,329,073 | Mitchell et al. | Sept. 7, 1943 |
| 2,338,732 | Nosker | Jan. 11, 1944 |
| 2,354,718 | Tuttle | Aug. 1, 1944 |
| 2,424,312 | Haynes | July 22, 1947 |
| 2,477,615 | Isbister | Aug. 2, 1949 |
| 2,496,551 | Lawson | Feb. 7, 1950 |